United States Patent
Menon et al.

(10) Patent No.: US 11,456,955 B2
(45) Date of Patent: Sep. 27, 2022

(54) TENANT-BASED MAPPING FOR VIRTUAL ROUTING AND FORWARDING

(71) Applicant: Juniper Networks, Inc., Sunnyvale, CA (US)

(72) Inventors: Abilash Menon, Boxborough, MA (US); Markus Jork, Andover, MA (US); John M. Peterson, Arlington, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/232,547

(22) Filed: Apr. 16, 2021

(65) Prior Publication Data

US 2021/0328917 A1 Oct. 21, 2021

Related U.S. Application Data (60) Provisional application No. 63/010,962, filed on Apr. 16, 2020.

(51) Int. Cl.
*H04L 45/586* (2022.01)
*H04L 45/00* (2022.01)
*H04L 45/745* (2022.01)

(52) U.S. Cl.
CPC ............ *H04L 45/586* (2013.01); *H04L 45/38* (2013.01); *H04L 45/566* (2013.01); *H04L 45/745* (2013.01)

(58) Field of Classification Search
CPC ..... H04L 45/586; H04L 45/38; H04L 45/566; H04L 45/745
USPC ........................................................ 709/238
See application file for complete search history.

(56) References Cited

U.S. PATENT DOCUMENTS

| | | | |
|---|---|---|---|
| 9,729,439 B2 | 8/2017 | MeLampy et al. | |
| 9,729,682 B2 | 8/2017 | Kumar et al. | |
| 9,762,485 B2 | 9/2017 | Kaplan et al. | |
| 9,826,025 B2 | 11/2017 | Bosch et al. | |
| 9,871,748 B2 | 1/2018 | Gosselin et al. | |
| 9,985,883 B2 | 5/2018 | MeLampy et al. | |
| 10,200,264 B2 | 2/2019 | Menon et al. | |
| 10,277,506 B2 | 4/2019 | Timmons et al. | |
| 10,432,522 B2 | 10/2019 | Kaplan et al. | |
| 10,999,182 B2 | 5/2021 | Kaplan et al. | |
| 2016/0134520 A1* | 5/2016 | Kapadia ............... | H04L 12/4633 370/392 |
| 2017/0250906 A1* | 8/2017 | MeLampy ............ | H04L 61/303 |

(Continued)

OTHER PUBLICATIONS

International Search Report and Written Opinion of International Application No. PCT/US2021/027649, dated Aug. 23, 2021, 13 pp.

(Continued)

*Primary Examiner* — Hermon Asres
(74) *Attorney, Agent, or Firm* — Shumaker & Sieffert, P.A.

(57) ABSTRACT

A network device is configured to associate a tenant of a plurality of tenants with a virtual routing and forwarding (VRF) instance of a plurality of VRF instances. The network device receives a packet comprising metadata specifying a tenant identifier for the tenant. The network device identifies, based on the tenant identifier specified by the metadata, the VRF instance associated with the tenant. The network device retrieves one or more routes from a routing information base (RIB) of the VRF instance associated with the tenant and forwards the packet toward a destination via the one or more routes.

20 Claims, 4 Drawing Sheets

(56) References Cited

U.S. PATENT DOCUMENTS

| | | |
|---|---|---|
| 2017/0324660 A1* | 11/2017 | Sinha .................... H04L 45/745 |
| 2020/0366589 A1 | 11/2020 | Kaplan et al. |
| 2020/0366590 A1 | 11/2020 | Kaplan et al. |
| 2020/0366598 A1 | 11/2020 | Kaplan et al. |
| 2020/0366599 A1 | 11/2020 | Kaplan et al. |

OTHER PUBLICATIONS

Lougheed et al., "A Border Gateway Protocol (BGP)," Network Working Group, RFC 1105, Jun. 1989, 17 pp.
Rekhter et al., "A Border Gateway Protocol 4 (BGP-4)," Network Working Group, RFC 1771, Mar. 1995, 57 pp.
U.S. Appl. No. 17/245,898, filed Apr. 30, 2021, naming inventors Kaplan et al.
U.S. Appl. No. 16/050,722, filed Jul. 31, 2018, naming inventors Timmons et al.

\* cited by examiner

TENANT-BASED MAPPING FOR VIRTUAL ROUTING AND FORWARDING

This application claims the benefit of U.S. Provisional Application No. 63/010,962, filed on Apr. 16, 2020, the entire content of which is incorporated herein by reference.

TECHNICAL FIELD

This disclosure generally relates to computer networks and, more specifically, routing packets within computer networks.

BACKGROUND

A computer network is a collection of interconnected computing devices that can exchange data and share resources. Example computing devices include routers, switches, and other layer two (L2) network devices that operate within layer two of the Open Systems Interconnection (OSI) reference model, i.e., the data link layer, and layer three (L3) network devices that operate within layer three of the OSI reference model, i.e., the network layer. Network devices within computer networks often include a control unit that provides control plane functionality for the network device and forwarding components for routing or switching data units.

Virtual routing and forwarding (VRF) is a technology that allows multiple instances of a routing information base (RIB) to co-exist within the same router at the same time. One or more logical or physical interfaces of a network device, such as a router, switch, or gateway, may each be associated with a VRF instance. Typically, different VRF instances do not share routes amongst one another such that, as a result, the network device forwards packets only between interfaces associated with the same VRF instance. Because the RIB of each VRF instance represents an independent routing domain, different VRF instances may use the same or overlapping IP addresses without conflict. This enables logical segmentation of network paths, e.g., for different entities (tenants), without requiring separate physical network devices.

SUMMARY

In general, this disclosure describes techniques for mapping tenants to VRF instances so as to enable application of tenant-specific and service-specific policies and routing decisions to network traffic. In one example, a network device is configured to associate a tenant of a plurality of tenants (e.g., entities that consume network services provided by a computer network) with a VRF instance of a plurality of VRF instances to logically isolate the tenant from other tenants and to implement routing policies specific to that tenant. When the network device receives a packet comprising a portion of metadata specifying a tenant identifier for the tenant, the network device identifies, based on the tenant identifier specified by the metadata, the VRF instance associated with the tenant. The network device retrieves one or more routes from a RIB of the VRF instance associated with the tenant to forward the packet toward a destination via the one or more routes.

In some examples, another portion of metadata of the packet further specifies a session identifier for a session associated with the packet. The network device determines, based on the session identifier, the session associated with the packet and further determines, based on the session, a service associated with the packet, e.g., a network service to be applied to the packet flow with which the packet is associated. When retrieving the one or more routes from the RIB of the VRF instance associated with the tenant, the network device may retrieve one or more routes for the determined service associated with the packet from the RIB. Additionally, or in the alternative, the network device may apply one or more policies to the packet based on the determined service associated with the packet.

The techniques of the disclosure may enable a network device as described herein to select different VRFs on a tenant-specific basis, and further to select different routes within the tenant-specific VRF on a service-specific basis. The techniques of the disclosure further enable a network device as described herein to select different policies for application to network traffic on a service-specific basis. Additionally, as described herein, the tenant-specific selection of VRFs and service-specific selection of routes and policies may be performed based on tenant and service identifiers carried by the network traffic as first and second portions of metadata. Therefore, a network device as described herein may apply different routes, traffic engineering, policies, priorities, or failover criteria to different tenants and/or different services. The service-level route selection and policy application described herein may allow each network device to make intelligent routing and policy decisions at the service- or application-level without the use of an SDN controller, whereas other network devices may only be able to apply policies to network traffic on a per-packet or per-flow basis. A network device as described herein may therefore perform routing decisions in a more flexible, efficient, and scalable manner than other devices.

In one example, this disclosure describes a method comprising: associating, by a network device, a tenant with a VRF instance of a plurality of VRF instances; receiving, by the network device, a packet comprising a first portion of metadata specifying a tenant identifier for the tenant and a second portion of metadata specifying a session identifier for a session associated with the packet; selecting, by the network device and based on the first portion of metadata specifying the tenant identifier, the VRF instance of the plurality of VRF instances associated with the tenant; determining, by the network device and based on the second portion of metadata specifying the session identifier, the session associated with the packet; determining, by the network device and based on the session, a service associated with the session; retrieving, by the network device and based on the determined service associated with the packet, one or more routes from a RIB of the selected VRF instance of the plurality of VRF instances associated with the tenant; and forwarding, by the network device, the packet toward a destination for the packet via the one or more routes.

In another example, this disclosure describes a system comprising: processing circuitry; and memory operably coupled to the processing circuitry and comprising instructions configured to cause the processing circuitry to: a network device configured to: associate a tenant with a VRF instance of a plurality of VRF instances; receive a packet comprising a first portion of metadata specifying a tenant identifier for the tenant and a second portion of metadata specifying a session identifier for a session associated with the packet; select, based on the first portion of metadata specifying the tenant identifier, the VRF instance of the plurality of VRF instances associated with the tenant; determine, based on the second portion of metadata specifying the session identifier, the session associated with the packet; determine, based on the session, a service associated with the session; retrieve, based on the determined service associated with the packet, one or more routes from a RIB of the selected VRF instance of the plurality of VRF instances associated with the tenant; and forward the packet toward a destination for the packet via the one or more routes.

In another example, this disclosure describes a non-transitory, computer-readable medium comprising instructions that, when executed, are configured to cause processing circuitry of a network device to: associate a tenant with a VRF instance of a plurality of VRF instances; receive a packet comprising a first portion of metadata specifying a tenant identifier for the tenant and a second portion of metadata specifying a session identifier for a session associated with the packet; select, based on the first portion of metadata specifying the tenant identifier, the VRF instance of the plurality of VRF instances associated with the tenant; determine, based on the second portion of metadata specifying the session identifier, the session associated with the packet; determine, based on the session, a service associated with the session; retrieve, based on the determined service associated with the packet, one or more routes from a RIB of the selected VRF instance of the plurality of VRF instances associated with the tenant; and forward the packet toward a destination for the packet via the one or more routes.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
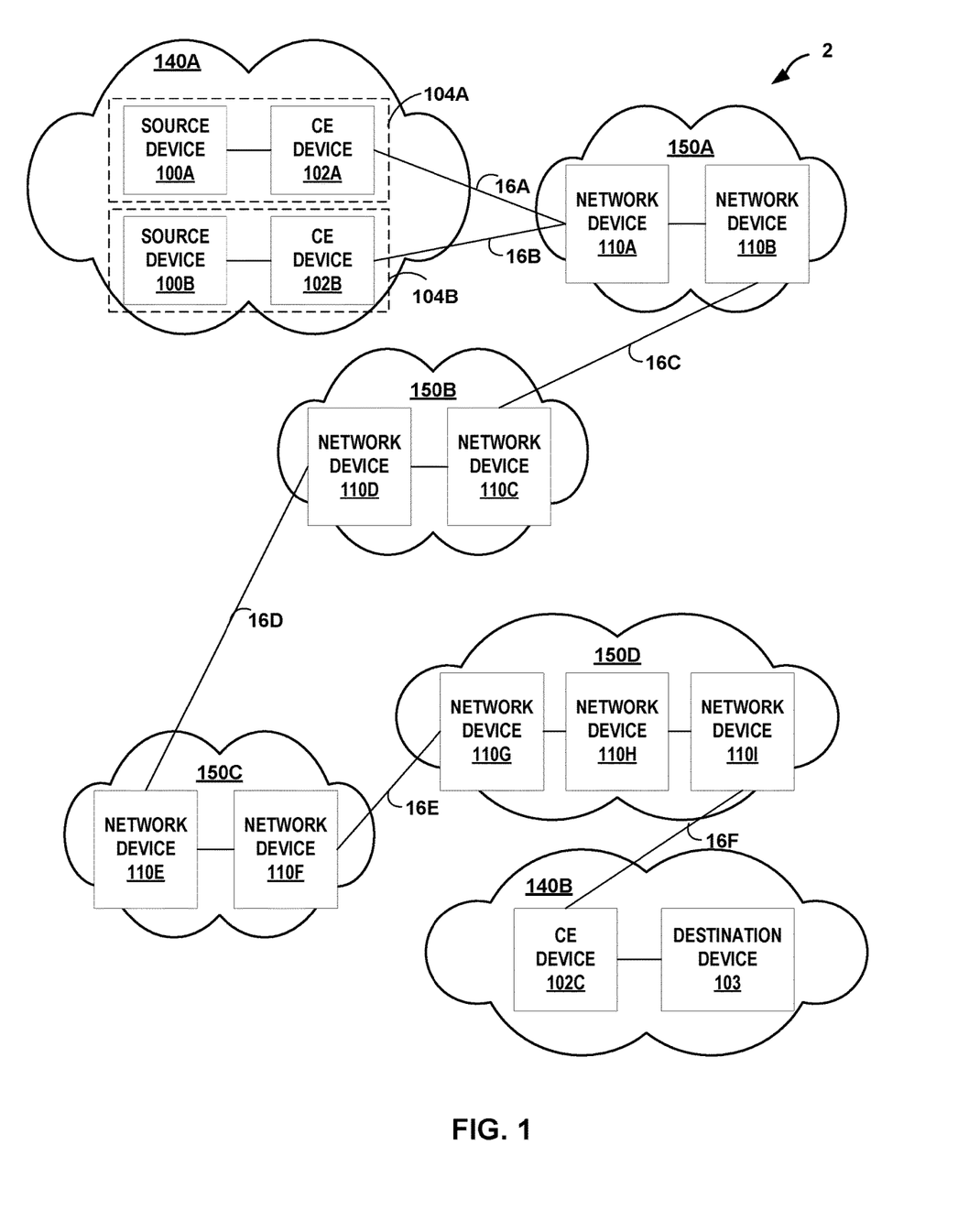
FIG. 1 is a block diagram illustrating an example computer network system in accordance with the techniques of the disclosure.

FIG. 1 is a block diagram illustrating example computer network system 2 in accordance with the techniques of the disclosure. In the example of FIG. 1, computer network system 2 includes service provider networks 150A-150D (collectively, "service provider networks 150") configured to provide Wide Area Network WAN) connectivity to disparate customer networks 140A-140B ("customer networks 140"). Although in the example of FIG. 1, computer network system 2 is illustrated as including multiple interconnected service provider networks 150, in other examples computer network system 2 may alternatively include a single service provider network that provides connectivity between customer networks 140. Network devices 110A-110I (collectively, "network devices 110") of service provider networks 150 provide source devices 100A and 100B (collectively, "source devices 100") and destination device 103 associated with customer networks 140 with access to service provider networks 150 via customer edge devices 102A-102C (collectively, "CE devices 102"). Communication links 16A-16F may be Ethernet, ATM or any other suitable network connections.

CE devices 102 and network devices 110 are illustrated as routers in the example of FIG. 1. However, techniques of the disclosure may be implemented using any network device, such as switches, routers, gateways, or other suitable network devices that may send and receive network traffic. Customer networks 140 may be networks for geographically separated sites of an enterprise, for example. Each of customer networks 140 may include additional customer equipment, such as, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices not depicted in FIG. 1. The configuration of computer network system 2 illustrated in FIG. 1 is merely an example. For example, computer network system 2 may include any number of customer networks 140. Nonetheless, for ease of description, only customer networks 140A-140B are illustrated in FIG. 1.

Service provider networks 150 represent one or more publicly accessible computer networks that are owned and operated by one or more service providers. A service provider is usually a large telecommunications entity or corporation. Each of service provider networks 150 is usually a large Layer-Three (L3) computer network, where reference to a layer followed by a number refers to a corresponding layer in the Open Systems Interconnection (OSI) model. Each service provider network 150 is an L3 network in the sense that it natively supports L3 operations as described in the OSI model. Common L3 operations include those performed in accordance with L3 protocols, such as the Internet Protocol (IP). L3 is also known as a "network layer" in the OSI model and the term L3 may be used interchangeably with the phrase "network layer" throughout this disclosure.

Although not illustrated, each service provider network 150 may be coupled to one or more networks administered by other providers, and may thus form part of a large-scale public network infrastructure, e.g., the Internet. Consequently, customer networks 140 may be viewed as edge networks of the Internet. Each service provider network 150 may provide computing devices within customer networks 140, such as source devices 100 and destination devices 103, with access to the Internet, and may allow the computing devices within customer networks 140 to communicate with each other.

Although additional network devices are not shown for ease of explanation, it should be understood that system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Moreover, although the elements of system 2 are illustrated as being directly coupled, it should be understood that one or more additional network elements may be included along any of network links 16, such that the network elements of system 2 are not directly coupled.

Each service provider network 150 typically provides a number of residential and business services for customer networks 140, including residential and business class data services (which are often referred to as "Internet services" in that these data services permit access to the collection of publicly accessible networks referred to as the Internet), residential and business class telephone and/or voice services, and residential and business class television services.

Session-Based Routing

In some examples, network devices 110 a stateful, session-based routing scheme that enables each network device 110 to independently perform path selection and traffic engineering. The use of session-based routing may enable network devices 110 to eschew the use of a centralized controller, such as a Software-Defined Networking (SDN) controller to perform path selection and traffic engineering. In this way, network devices 110 may be more efficient and scalable for large networks where the use of an SDN controller would be infeasible. Furthermore, the use of session-based routing may enable network devices 110 to eschew the use of tunnels, thereby saving considerable network resources by obviating the need to perform encapsulation and decapsulation at tunnel endpoints. In some examples, network devices 110 implement session-based routing as Secure Vector Routing (SVR), provided by Juniper Networks, Inc.

As described herein, a network session (also referred to herein as a "session") includes a forward packet flow originating from a first device and destinated for a second device and/or a reverse packet flow originating from the second device and destined for the first device. The session may be bidirectional in that the session may include packets travelling in both directions (e.g., a forward packet flow and a reverse packet flow) between the first and second devices.

When, e.g., network device 110A receives a packet for a flow originating from source device 100A and destined for destination device 103, network device 110A determines whether the packet belongs to a new session (e.g., is the "first" packet or "lead" packet of the session). In some examples, network device 110A determines whether a source address, source port, destination address, destination port, and protocol of the first packet matches an entry in a session table.

If no such entry exists, network device 110A determines that the packet belongs to a new session and creates an entry in the session table. Furthermore, if the packet belongs to a new session, network device 110A generates a session identifier for the session. The session identifier may comprise, e.g., a source address and source port of source device 100A, a destination address and destination port of destination device 103, and a protocol used by the first packet. Network device 110A may use the session identifier to identify subsequent packets as belonging to the session.

In some examples, network devices 110 perform stateful routing for a session. This means that network devices 110 forward each packet of the forward packet flow of a session sequentially and along the same forward network path. As described herein, the "same" forward path means the same network devices 110 that form a segment or at least a portion between a device originating the packet and a device to which the packet is destined (and not necessarily the entire network path between the device originating the packet and the device to which the packet is destined). Further, network devices 110 forward each packet of the return flow of the session sequentially and along the same return network path. The forward network path for the forward packet flow and the return network path of the return flow may be the same path, or different paths. By ensuring that each packet of a flow is forwarded sequentially and along the same path, network devices 110 maintain the state of the entire flow at each network device 110, thereby enabling the use of stateful packet services, such as Deep Packet Inspection (DPI).

In the example of FIG. 1, a stateful routing session may be established from ingress network device 110A through intermediate network devices 110B-110H to egress network device 110I. In this example, network device 110A determines that the first packet is an unmodified packet and the first packet of a new session. Network device 110A modifies the first packet to include metadata specifying the session identifier (e.g., the original source address, source port, destination address, and destination port). Network device 110A replaces the header of the modified first packet to specify a source address that is an address of network device 110A, a source port that is a port via which network device 110A forwards the modified first packet toward destination device 103, a destination address that is an address of the next hop to which network device 110A forwards the first packet (e.g., an address of network device 110B), and a destination port that is a port of the next hop to which network device 110A forwards the first packet (e.g., a port of network device 110B).

Network device 110A may further identify a network service associated with the session. For example, network device 110A may compare one or more of a source address, source port, destination address, or destination port for the session to a table of service address and port information to identify a service associated with the session. Examples of network services include Hypertext Transfer Protocol (HTTP), a firewall service, a proxy service, packet monitoring or metrics services, etc. For example, if the source port and/or destination port for the session is 80, network device may determine that the session is associated with HTTP. In other examples, network device 110A may determine that one or more of a source address, source port, destination address, or destination port for the session belong to a block of address or ports indicative that a particular service is associated with the session.

In some examples, network device 110A uses the determined network service for the session to select a forward path for forwarding the first packet and each subsequent packet toward destination device 103. In this fashion, network device 110A may perform service-specific path selection to select a network path that best suits the requirements of the service. In contrast to a network topology that uses an SDN controller to perform path selection, each network device 110 performs path selection. Further, the use of session-based routing enables each network device 110 to make routing decisions at the service- or application-level, in contrast to conventional network devices that are only able to make routing decisions at the flow level.

Network device 110A forwards the modified first packet to network device 110B. Additionally, network device 110A stores the session identifier for the session such that, upon receiving subsequent packets for the session, network device 110A may identify subsequent packets as belonging to the same session and forward the subsequent packets along the same path as the first packet.

Intermediate network device 110B receives the modified first packet and determines whether the modified first packet includes a portion of metadata specifying the session identifier. In response to determining that the modified first packet includes metadata specifying the session identifier, intermediate network device 110B determines that network device 110B is not an ingress device such that network device 110B does not attach metadata specifying the session identifier.

As described above with respect to network device 110A, network device 110B determines whether the packet belongs to a new session (e.g., is the "first" packet or "lead" packet of the session) by determining whether a source address, source port, destination address, destination port, and protocol of the first packet matches an entry in a session table.

If no such entry exists, network device 110B determines that the packet belongs to a new session and creates an entry in the session table. Furthermore, if the packet belongs to a new session, network device 110B generates a session identifier for the session. The session identifier used by network device 110B to identify the session for the first packet may be different from the session identifier used by network device 110A to identify the same session for the first packet, because each network device 110A, 110B uses the header source address, source port, destination address, and destination port of the first packet to generate the session identifier, and this information is modified by each preceding network device 110 as each network device 110 forwards the first packet along the forward path.

Network device 110B replaces the header of the modified first packet to specify a source address that is an address of network device 110B, a source port that is a port via which network device 110B forwards the modified first packet toward destination device 103, a destination address that is an address of the next hop to which network device 110B forwards the first packet (e.g., an address of network device 110C), and a destination port that is a port of the next hop to which network device 110B forwards the first packet (e.g., a port of network device 110C). Network device 110B forwards the modified first packet to network device 110C. Additionally, network device 110B stores the session identifier for the session such that, upon receiving subsequent packets for the session, network device 110B may identify subsequent packets as belonging to the same session and forward the subsequent packets along the same path as the first packet.

Subsequent intermediate network devices 110C-110H process the modified first packet in a similar fashion as network devices 110A and 110B such that network devices 110 forward the subsequent packets of the session along the same path as the first packet. Further, each network device 110 stores a session identifier for the session, which may include an identification of the previous network device 110 along the network path. Thus, each network device 110 may use the session identifier to forward packets of the reverse packet flow for the session along the same network path back to source device 100A.

A network device 110 that may forward packets for a forward packet flow of the session to a destination for the packet flow is an egress, or "terminus" network device. In the foregoing example, network device 110I is a terminus network device because network device 110I may forward packets to CE device 102C for forwarding to destination device 103. Network device 110I receives the modified first packet that comprises the metadata specifying the session identifier (e.g., the original source address, source port, destination address, and destination port). Network device 110I identifies the modified first packet as destined for a service terminating at network device 110I by determining that the destination source address and destination source port specified in the metadata of the modified lead packet corresponds to a destination reachable by network device 110I (e.g., destination device 103 via CE device 102C). Network device 110I recovers the original first packet by removing the metadata from the modified first packet and modifying the header of the first packet to specify the original source address, source port, destination address, and destination port. Network device 110I forwards the recovered first packet to CE device 102C for forwarding to destination device 103.

Additional information with respect to session-based routing and SVR is described in U.S. Pat. No. 9,729,439, entitled "COMPUTER NETWORK PACKET FLOW CONTROLLER," and issued on Aug. 8, 2017; U.S. Pat. No. 9,729,682, entitled "NETWORK DEVICE AND METHOD FOR PROCESSING A SESSION USING A PACKET SIGNATURE," and issued on Aug. 8, 2017; U.S. Pat. No. 9,762,485, entitled "NETWORK PACKET FLOW CONTROLLER WITH EXTENDED SESSION MANAGEMENT," and issued on Sep. 12, 2017; U.S. Pat. No. 9,871,748, entitled "ROUTER WITH OPTIMIZED STATISTICAL FUNCTIONALITY," and issued on Jan. 16, 2018; U.S. Pat. No. 9,985,883, entitled "NAME-BASED ROUTING SYSTEM AND METHOD," and issued on May 29, 2018; U.S. Pat. No. 10,200,264, entitled "LINK STATUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019; and U.S. Pat. No. 10,432,522, entitled "NETWORK PACKET FLOW CONTROLLER WITH EXTENDED SESSION MANAGEMENT," and issued on Oct. 1, 2019, the entire content of each of which is incorporated herein by reference in its entirety.

Exchanging Service and Topology State Information

In some examples, to implement session-based routing, each network device 110 maintains a local repository of service and topology state information for each other network device 110. The service and topology state information includes services reachable from each network device 110, as well as a network topology from each network device for reaching these services. Each network device 110 may transmit changes in the services reachable from the network device 110 and/or changes in the network topology for reaching the services from the network device to a central repository, e.g., a server. Further, each network device 110 may receive service and topology state information for each other network device 110 in system 2 from the central repository.

In the foregoing example, network device 110A receives a packet, determines a session for a packet flow comprising the packet, determines a service associated with the session, and selects a network path for forwarding the packet. Network device 110A may use its local copy of the service and topology state information for each network device 110 to select the network path for forwarding the packet. For example, network device 110A may use the identified service associated with the packet and a network topology for reaching the identified service to select a network path that comports with a Service Level Agreement (SLA) requirement or other performance requirements for the service. Network device 110A may then forward the packet and subsequent packets for the flow along the selected path. In this fashion, network device 110A may perform service-specific path selection in that network device 110 may use criteria specific to the service associated with the packet to select a network path that best suits the requirements of the service.

Additional information with respect to the exchange of service and topology state information is described in U.S. Patent Application Publication No. 2020/0366590, entitled "CENTRAL AUTHORITY FOR SERVICE AND TOPOLOGY EXCHANGE," published on Nov. 19, 2020; U.S. Patent Application Publication No. 2020/0366599, entitled "SOURCE-BASED ROUTING," published on Nov. 19, 2020; U.S. Patent Application Publication No. 2020/0366598, entitled "SERVICE AND TOPOLOGY EXCHANGE PROTOCOL," published on Nov. 19, 2020; U.S. Patent Application Publication No. 2020/0366589, entitled "ROUTING USING SEGMENT-BASED METRICS," published on Nov. 19, 2020; and U.S. patent application Ser. No. 16/050,722, entitled "NETWORK NEIGHBORHOODS FOR ESTABLISHING COMMUNICATION RELATIONSHIPS BETWEEN COMMUNICATION INTERFACES IN AN ADMINISTRATIVE DOMAIN,"

filed on Jul. 31, 2018, the entire content of each of which is incorporated herein by reference in its entirety.

Tenant-Based Routing

Computer network system 2 may provide network services to one or more tenants. A "tenant" in this example is a source of network traffic and consumes the network services provided by a computer network. Typically, a tenant is the entity that originates a network session associated with a network service. A tenant, as described herein, may be considered to be broader than merely a customer or enterprise that is logically isolated from other customers or enterprises within a virtual networking model. Tenants typically are considered to be global in nature. A tenant may be considered to be one or more entities to which a policy may be applied. In some examples, a tenant is defined as having a hierarchical scope such that one or more entities may be grouped hierarchically such that a policy may be applied to the group. In some examples, a tenant is defined as a network interface, the network interface being an object or entity to which a policy may be applied. In some examples, a tenant is defined as an Internet Protocol (IP) address or a block of IP addresses to which a policy may be applied. Such policies may include security policies which specify which tenants may access a network service. Further, such policies may include SLAs that define how tenants may access the network service. The "tenant" concept described herein may be useful where writing security policies based on IP addresses alone may be insufficient, e.g., for mobile users and/or fuzzy edge networks. In some examples, a tenant is classified by assigning a tenant to a network interface such that network traffic originating from the interface is classified as belonging to the assigned tenant. In some examples, a tenant is classified by assigning a tenant to one or more prefixes (e.g., an IP address prefix).

For example, as depicted in FIG. 1, system 2 may classify a first interface of network device 110A over which network device 110A receives network traffic from source device 100A and CE device 102A as belonging to tenant 104A. System 2 may classify a second interface of network device 110A over which network device 110A receives network traffic from source device 100B and CE device 102B as belonging to tenant 104B.

In some examples, tenants are organized into a hierarchical model. For example, each tenant may include one or more subtenants. This may enable system 2 to apply policies in a hierarchical fashion such that a policy may be applied to a particular tenant, as well as each of its subtenants. Furthermore, different policies may be applied to different subtenants of the same tenant. In some examples, each subtenant may have sub-subtenants of its own, and so on.

In accordance with the techniques of the disclosure, computer network system 2 implements techniques for mapping tenants to VRF instances so as to enable application of routing decisions and policies to network traffic that are both tenant-specific and service-specific. For example, network devices 110 are configured (e.g., by a network administrator) to associate each tenant of a plurality of tenants with a different VRF instance of a plurality of VRF instances. As depicted in the example of FIG. 1, source device 100A and CE device 102B belong to first tenant 104A and source device 100B and CE device 102B belong to second tenant 104B (collectively, "tenants 104"). Network device 110A assigns tenant 104A to a first VRF instance and tenant 104B to a second VRF instance. As described in more detail below, each VRF instance comprises a unique RIB that network device 110A may use to make tenant-specific routing decisions. Typically, if a tenant is mapped to a VRF instance, each subtenant of the tenant is mapped to the same VRF instance. In some examples, one or more subtenants of a tenant may each also be assigned a unique VRF instance.

In some examples, a tenant may be assigned to multiple, different VRF instances of different network devices 110. For example, network device 110A may associate tenant 104A with a first VRF instance of a plurality of VRF instances for network device 110A. Furthermore, network device 110B, e.g., may associate tenant 104A with a second VRF instance of a plurality of VRF instances for network device 110B. The first VRF instance of network device 110A and the second VRF instance of network device 110B associated with the same tenant 104A may be the same or different. For example, the first VRF instance of network device 110A and the second VRF instance of network device 110B may include a same RIB or a different RIB from one another.

Network device 110A receives, from CE device 102A, a packet comprising a first portion of metadata specifying a tenant identifier for tenant 104A. In some examples, the tenant identifier is a natural language text string. The text string may be a human-readable identifier that specifies a name of tenant 104A. In some examples, the tenant identifier is a Virtual Local Area Network (VLAN) identifier associated with the tenant or an IP address of a network interface assigned to the tenant, etc. Network device 110A identifies, based on the tenant identifier specified by the first portion of metadata, the VRF instance associated with tenant 104A.

In some examples, the packet further comprises a second portion of metadata that specifies a session identifier for a session associated with the packet. Using the techniques described above for session-based routing, network device 110A determines, based on the session identifier, the session associated with the packet and further determines, based on the session, a service associated with the packet. Network device 110A selects, based on the determined service associated with the packet, one or more routes from a RIB of the VRF instance associated with tenant 104A.

Additionally, or in the alternative, the network device may apply one or more policies to the packet based on the determined service associated with the packet. For example, network device 110 may identify one or more of an SLA requirement, a performance requirement, a cost metric, or a priority for the service, etc., and select one or more routes from the RIB of the VRF instance associated with tenant 104A that comport with such criteria.

Network device 110A forwards the packet toward a destination for the packet via the one or more routes. In some examples, the destination is a server that provides the network service. In some examples, network device 110A forwards the packet and each subsequent packet for the flow in order toward the destination for the packet flow via the one or more routes.

Accordingly, the techniques of the disclosure may enable network device 110A to use different RIBs, and therefore different routes, for traffic of different tenants, even where the traffic of different tenants involves the same network service. Furthermore, the techniques of the disclosure may enable network device 110 to apply different policies to network traffic of each tenant on a per-service basis. The application of service-level policies allows each network device 110 to make intelligent routing decisions at the service- or application-level without the use of an SDN controller, whereas other network devices may be able only to apply policies to network traffic on a per-packet or per-flow basis. Therefore, a network device as described herein may forward network traffic associated with a particular service but belonging to two different tenants along different, tenant-specific routes and according to different, service-specific policies, thereby allowing network device 110A to apply different routes, traffic engineering, policies, priorities, or failover criteria to traffic of different tenants 104. A network device as described herein may therefore perform routing decisions in a more flexible, efficient, and scalable manner than other devices.

Figure 2:
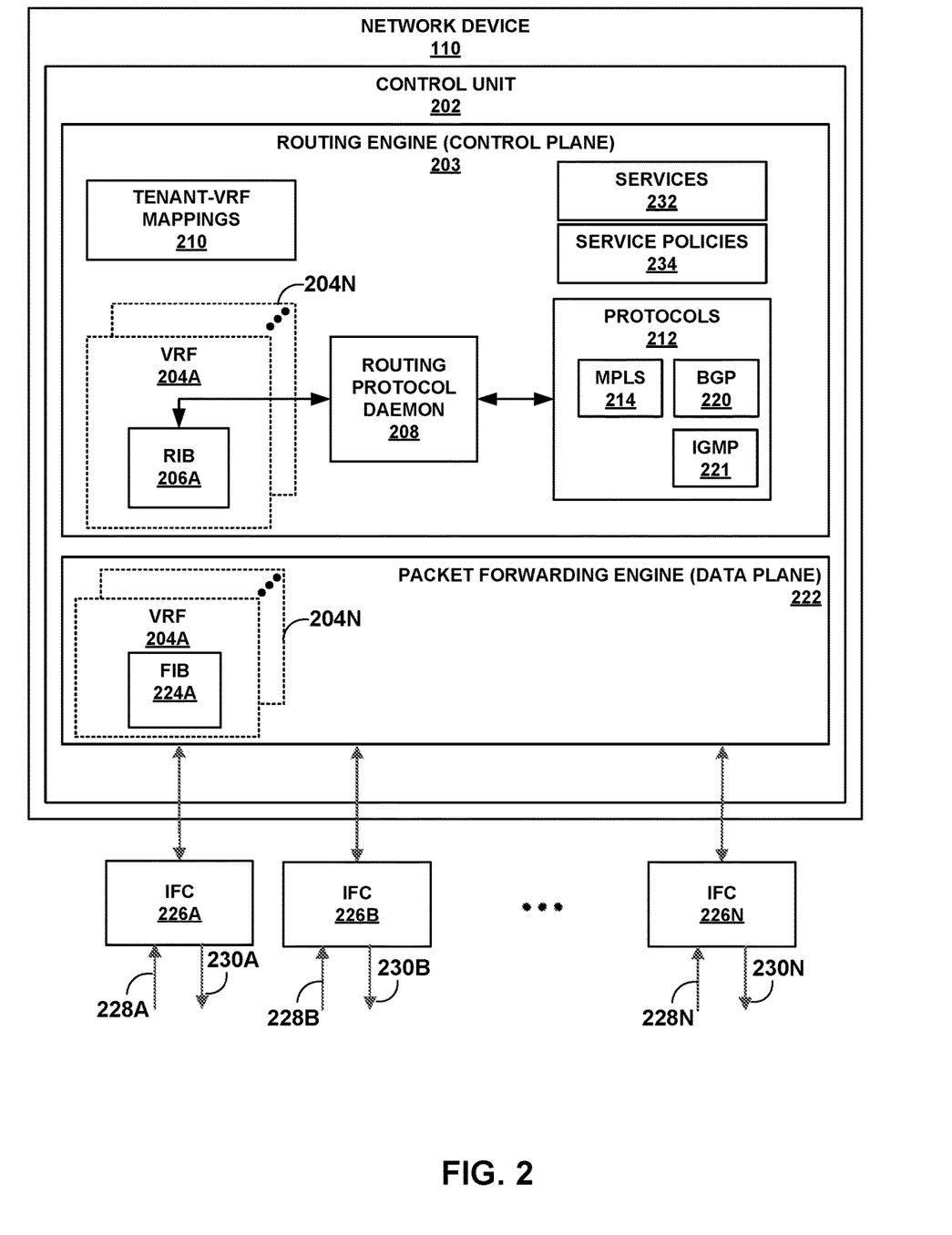
FIG. 2 is a block diagram illustrating an example network device in accordance with the techniques of the disclosure.

FIG. 2 is a block diagram illustrating example network device 110 in accordance with the techniques of the disclosure. In general, network device 110 may be an example of one of network devices 110 of FIG. 1. In this example, network device 110 includes interface cards 226A-226N ("IFCs 226") that receive packets via incoming links 228A-228N ("incoming links 228") and send packets via outbound links 230A-230N ("outbound links 230"). IFCs 226 are typically coupled to links 228, 230 via a number of interface ports. Network device 110 also includes a control unit 202 that determines routes of received packets and forwards the packets accordingly via IFCs 226.

Control unit 202 may comprise routing engine 203 and packet forwarding engine 222. Routing engine 203 operates as the control plane for network device 110 and includes an operating system that provides a multi-tasking operating environment for execution of a number of concurrent processes. Routing engine 203 communicates with other network devices, e.g., such as network devices 110 of FIG. 1, to establish and maintain a computer network, such as computer network system 2 of FIG. 1, for transporting network traffic between one or more customer devices. Routing protocol daemon (RPD) 208 of routing engine 203 executes software instructions to implement one or more control plane networking protocols 212. For example, protocols 212 may include one or more routing protocols, such as Border Gateway Protocol (BGP) 220, for exchanging routing information with other routing devices and for updating RIB 206, Multiprotocol Label Switching (MPLS) protocol 214, and Internet Group Management Protocol (IGMP) 221.

RIB 206 may describe a topology of the computer network in which network device 110 resides, and may also include routes through the shared trees in the computer network. RIB 206 describes various routes within the computer network, and the appropriate next hops for each route, i.e., the neighboring routing devices along each of the routes. Routing engine 203 analyzes information stored in RIB 206 and generates forwarding information for forwarding engine 222, stored in Forwarding information base (FIB) 224. FIB 224 may associate, for example, network destinations with specific next hops and corresponding IFCs 226 and physical output ports for output links 230. FIB 224 may be a radix tree programmed into dedicated forwarding chips, a series of tables, a complex database, a link list, a radix tree, a database, a flat file, or various other data structures.

FIB 224 may also include lookup structures. Lookup structures may, given a key, such as an address, provide one or more values. In some examples, the one or more values may be one or more next hops. A next hop may be implemented as microcode, which when executed, performs one or more operations. One or more next hops may be "chained," such that a set of chained next hops perform a set of operations for respective different next hops when executed. Examples of such operations may include applying one or more services to a packet, dropping a packet, and/or forwarding a packet using an interface and/or interface identified by the one or more next hops.

Tenancy, as described herein, allows an administrator to create partitions within a network in order to segment access to network services. A tenant is effectively a network "perimeter" that defines a grouping of devices, and creates a de facto trust zone. Users within a tenant, by default, are given access to the same set of services; or, said another way, members of a tenant share common network policy.

A tenant represents the basic means for grouping collections of devices together into a network segment. The devices within a tenant are treated with a common policy, and thereby will have consistent access to the services that have been "published" to the tenant.

In accordance with the techniques of the disclosure, each tenant, as modeled by routing engine 204, has its own segment of FIB 224 for making forwarding decisions for packets it receives. As services are made available to a tenant, entries are populated into the corresponding FIB 224, keyed by that tenant's name; members of that tenant will have routes to respective service, and non-members will not. Therefore, the use of tenancy may obviate the need for complex access controls or external firewalling by other devices.

An administrator may use several ways to define or describe how inbound packets are mapped to tenants: 1) by matching the source IP address of inbound packets to configured IP prefixes within a network neighborhood, or 2) based upon their ingress network-interface. In some examples, when both methods are in use within network device 110, the network-interface's tenant will take precedence if both apply.

An example configuration for defining a tenant is set forth below:

--- admin@labsystem1.burlington# config authority admin@labsystem1.burlington (authority)# tenant engineering admin@labsystem1.burlington (tenant[name=engineering])#
"description engineering division"

admin@labsystem1.burlington (tenant[name=engineering])# security internal admin@labsystem1.burlington (tenant[name=engineering])# show name engineering description "engineering division"

security internal

---

In the foregoing example configuration, the field security refers to another configuration element on the system (a security policy), which governs how network device 110 may encrypt and authenticate packets it receives and forwards. In this example, "internal" refers to a default security element.

In some examples, an administrator may use subnets to define the composition of a tenant. This is done within the tenant's configuration, where a list of one or more subnets is specified within a neighborhood. These subnets are applicable to the interfaces that contain these neighborhoods, unless an interface has an explicitly assigned tenant. Any lead packet of a session that arrives on any tenantless interface is matched to provisioned subnets of all neighborhoods within the tenants to determine tenant membership. Said another way, the ingress interface has zero or more neighborhoods configured on it; for each of these neighborhoods, the source IP address is matched to tenant members to determine whether this IP address can be affiliated with a tenant. The tenant affiliation is then used as part of a lookup key of the corresponding FIB 224, to determine disposition of that lead packet.

In some examples, an administrator may add a list of one or more subnets to a tenant configuration. In the example configuration below, three such subnets are added to the the tenant created in the foregoing example:

```
admin@labsystem1.burlington# conf authority
admin@labsystem1.burlington (authority)# tenant engineering
admin@labsystem1.burlington (tenant[name=engineering])# member HQnetwork
admin@labsystem1.burlington (member[neighborhood=HQnetwork])# address
172.17.128.0/24
admin@labsystem1.burlington (member[neighborhood=HQnetwork])# up
admin@labsystem1.burlington (tenant[name=engineering])# show
name engineering
description "engineering division"
security internal
member HQnetwork
    neighborhood HQnetwork
    address 172.17.128.0/24
exit
```

Each network device 110 may be considered to be a collection of one or more nodes, which represent the top of the hierarchy of a single deployment of a networking system. In turn, each node communicates with an IP network via device interfaces (physical interfaces), e.g., physical connections to the network on bare metal systems, or bridged interfaces where the networking system is deployed in virtual environments. Network interfaces (logical interfaces), or VLANs may be configured on top of the device interfaces. The relationship in each of these levels of the hierarchy is many to one; e.g., there can be many device-interface elements per node, and many network-interface elements per device-interface.

Each of these network-interfaces has an optional configuration field called "tenant." By applying a tenant name to this interface, packets received on this interface are presumed to belong to that tenant, even if the source IP address of that packet would indicate it is a member of a neighborhood-defined tenant. This restricts the set of routes available to sources that reach the 128T router via this interface to only those available to that tenant.

This is accomplished by way of each router filtering the routes in a corresponding FIB 224 to only those pertinent to the specific tenant. As depicted in the following example configuration, the tenant becomes part of the lookup key into the corresponding FIB 224, so only routes matching the tenant will match:

```
admin# config authority
admin (authority)# router burlington
admin (router[name=burlington])# node node1
admin (node[name=slice1])# device-interface 12
admin (device-interface[id=11])# network-interface int12
admin (network-interface[name=int12])# tenant engineering
```

The finished configuration for the above example is:

```
admin (network-interface[name=int12])# show
name int12
description "Engineering network"
vlan 0
type external
tenant engineering
address 10.1.0.1
    ip-address 10.1.0.1
    prefix-length 24
exit
```

With respect to the foregoing example, inbound requests on this specific network-interface, considered part of the "engineering" tenant, are able to access only services that are part of the engineering tenant, or those services in other tenants that have explicitly allowed (via access-policy) members of the engineering tenant.

Accordingly, network device 110 may not only partition a user population into various tenants, but further allows for segmentation of those tenants into "families" of tenants, e.g., a hierarchical (family) tree, where subtenants (children) inherit properties from their parentage. When granting access to a service to a tenant, all subtenants of that tenant are also granted access by default. However, the converse is not true. When a subtenant is granted access to a service, the parent tenant may not have routes to it. This allows for fine-grained access control, where services and tenant families can be combined to give access to network services to very specific user populations.

The following example depicts a configuration for a subtenant, a further refinement of the "engineering" tenant created in the foregoing example:

```
admin@labsystem1.burlington# config authority
admin@labsystem1.burlington (authority)# tenant dev.engineering
admin@labsystem1.burlington (tenant[name=dev.engineering])# member HQnetwork
admin@labsystem1.burlington (member[neighborhood=HQnetwork])# address
172.17.2.0/25
admin@labsystem1.burlington (member[neighborhood=HQnetwork])# up
admin@labsystem1.burlington (tenant[name=dev.engineering])# description
"development team"
admin@labsystem1.burlington (tenant[name=dev.engineering])# security internal
admin@labsystem1.burlington (tenant[name=dev.engineering])# show
name dev.engineering
description "development team"
security internal
```

-continued

```
member HQnetwork
    neighborhood HQnetwork
    address 172.17.2.0/25
exit
```

This foregoing configuration fragment establishes a user population within the subnet 172.17.2.0/25 as members of the dev.engineering team. In some examples, network device 110 uses dotted notation to indicate tenant parentage: dev.engineering is a child of engineering. The dotted notation is not limited to one level of depth. Rather, a tenant family can have an arbitrarily large number of descendants, e.g., eastcoast.dev.engineering, or bldg12.eastcoast.dev.engineering. Irrespective of the number of levels of the tenant hierarchy, children have access to services offered by their parents, but parents do not have access to services offered by their children.

Assigning a tenant to a network-interface may enable network device 110 to use membership to identify subtenants. However, typically an administrator may not override a network-interface tenant with a different tenant tree. Referencing the example above, adding a member for HQnetwork in a different tenant "family" (such as developer.acme) would have no effect. The assignment of engineering to the network-interface strictly limits tenant affiliation to engineering and/or its children.

As described in the foregoing examples, tenancy can be determined on network device 110 in two ways: 1) by assigning a tenant to an interface, or 2) by creating neighborhood-based tenant members that may use the source IP address within a neighborhood to glean tenancy. If neither of these rulesets apply, for example, if network device 110 receives a packet on an interface without a tenant assigned, and the packet does not match a tenant's member definition for the neighborhood(s) on that interface, then the tenancy of that session is said to be assigned to a global tenant, which may also be referred to herein as "tenantless." The services available to the global tenant are limited to only those whose scope is set to public. Typically, an administrator may not configure an access-policy that specifies whether the global tenant has access to a service. The result of the "global" tenant is that network device 110 may operate without any tenant definitions whatsoever. For example, assuming all service configurations have a scope set to public, then routing engine 204 unilaterally applies a global FIB 224 to all inbound packets.

In accordance with the techniques of the disclosure, network device 110 implements techniques for mapping tenants to VRF instances so as to enable application of routing decisions and policies to network traffic that are both tenant-specific and service-specific. As depicted in the example of FIG. 2, routing engine 203 stores an association of each tenant of a plurality of tenants 104 of FIG. 1 with a corresponding VRF instance of a plurality of VRF instances 204A-204N (hereinafter, "VRF instances 204") as tenant-VRF mappings 210. As one example, routing engine 203 stores an association between tenant 104A of FIG. 1 and VRF instance 204A. In some examples, routing engine 203 receives a configuration specifying the associations between each tenant 104 and each VRF instance 204, from, e.g., an administrator, another router, or an orchestrator device.

Control unit 202 receives, via one of incoming links 228, a packet. The packet comprises a header, payload data, and metadata. A first portion of the metadata comprises a tenant identifier that identifies tenant 104A. A second portion of the metadata comprises a session identifier that identifies a session associated with the packet. Routing engine 203 selects, based on the first portion of the metadata specifying the tenant identifier for tenant 104A, VRF instance 204A as the VRF instance associated with the tenant. For example, routing engine 203 determines that the tenant identifier specified by the metadata of the packet matches a tenant identifier assigned to VRF instance 204A stored in tenant-VRF mappings 210.

Furthermore, routing engine 203 determines, based on the second portion of the metadata specifying the session identifier, a session associated with a packet flow comprising the packet and a reverse packet flow. For example, the session identifier may comprise, e.g., a source address and source port, a destination address and destination port, and a protocol used by the packet. Routing engine 203 further determines, based on the session associated with the packet, a service associated with the session. As an example, the session identifier may comprise one or more of source address, source port, destination address, destination port, or protocol. Routing engine 203 may query services table 232 with one or more of the source address, source port, destination address, destination port, or protocol of the session to determine a service associated with the session identifier.

Routing engine 203 retrieves, based on the determined service, one or more routes from RIB 206A of VRF instance 204A. In some examples, routing engine 203 obtains one or more service policies 234 for each service reachable by routing engine 203. The service policies may include, e.g., a path failover policy, a Differentiated Services Code Point (DSCP) marking policy, a traffic engineering policy, a priority for network traffic associated with the session, etc. Routing engine 203 applies, to the packet, one or more service policies 234 that correspond to the service associated with the packet. Routing engine 203 forwards, via packet forwarding engine 222, the packet toward a destination for the packet via the one or more routes retrieved from RIB 206A.

Routing engine 203 forwards, via packet forwarding engine 222, the packet toward a destination for the packet via the one or more routes retrieved from RIB 206A associated with the tenant. In some examples, routing engine 203 forwards, via packet forwarding engine 222, the packet and each subsequent packet of the packet flow toward a destination of the packet flow via the one or more routes. In some examples, if a tenant is not mapped to a VRF instance, the tenant may default to a global RIB.

In some examples, each VRF instance 204 implements a unique FIB 224A-224N (collectively, "FIB 224") within packet forwarding engine 222. In this example, prior to forwarding the packet, packet forwarding engine 222 may determine if FIB 224A of VRF instance 204A associated with tenant 104A includes an address of the destination for the packet. If FIB 224A does not include the address of the destination, routing engine 203 may perform BGP lookup for one or more routes to the address of the destination. Upon obtaining the one or more routes to the address of the destination, routing engine 203 may store, in RIB 206A of VRF instance 204A, the one or more routes to the address of the destination. Routing engine 203 subsequently retrieves, from RIB 206A of VRF instance 204A, the one or more routes to the address of the destination for forwarding, via packet forwarding engine 222, the packet toward the destination for the packet. In some examples, if routing engine 203 is unable to obtain the one or more routes to the address of the destination via BGP route lookup, routing engine 203 may drop the packet. Additional information with respect to BGP and BGP route lookup is described in "A Border Gateway Protocol (BGP)," RFC 1105, Internet Engineering Task Force (IETF), June 1989, available at https://tools.ietf.org/html/rfc1105, and "A Border Gateway Protocol 4 (BGP-4)," RFC 1771, Internet Engineering Task Force (IETF), March 1995, available at https://tools.ietf.org/html/rfc1771, the entire contents of each of which are incorporated herein by reference.

In some examples, the use of different VRF instances 204, and therefore different RIBs 206, for different tenants may enable network device 110A to forward traffic from two different tenants 104 and destined for the same service along two different routes having different policies. As an illustrative example, routing engine 203 associates tenant 104A of FIG. 1 with VRF instance 204A and associates tenant 104B of FIG. 1 with VRF instance 204B. Control unit 202 receives, via incoming links 228, a first packet comprising a first portion of metadata specifying a tenant identifier associated with tenant 104A and a second portion of metadata specifying a first session identifier. Further, control unit 202 receives, via incoming links 228, a second packet comprising a first portion of metadata specifying a tenant identifier associated with tenant 104B and a second portion of metadata specifying a second session identifier.

Routing engine 203 determines, based on the first session identifier in the second portion of metadata of the first packet, a first session associated with a first packet flow comprising the first packet. Further, routing engine 203 determines, based on the first session, a service associated with the first session. Routing engine 203 further determines, based on the second session identifier in the second portion of metadata of the second packet, a second session associated with a second packet flow comprising the second packet. Further, routing engine 203 determines, based on the second session, a service associated with the second session that is the same as the service associated with the first session.

Routing engine 203 identifies, based on the first tenant identifier specified by the first portion of metadata of the first packet, VRF instance 204A. Routing engine 203 selects, based on the service associated with the first session, one or more first routes from RIB 206A of VRF instance 204A for forwarding the first packet toward a server providing the service. Routing engine 203 forwards, via packet forwarding engine 222, the first packet toward the server providing the service along the one or more first routes.

Further, routing engine 203 identifies, based on the second tenant identifier specified by the first portion of metadata of the second packet, VRF instance 204B. Routing engine 203 retrieves, based on the service associated with the second session, one or more second routes from RIB 206B of VRF instance 204B for forwarding the second packet toward the server providing the service, the one or more second routes different from the one or more first routes. Routing engine 203 forwards, via packet forwarding engine 222, the second packet toward the server providing the service along the one or more second routes. Thus, as demonstrated via the foregoing example, the use of different VRF instances 204 for different tenants 104 may enable network device 110A to forward network traffic of two different tenants 104 along two different routes, even when the network traffic of each tenant 104 is destined for the same service.

The use of tenancy by a network device as described herein may provide advantages over other network devices that assign Virtual Local Area Networks (VLANs) to different VRF instances. A VLAN is a construct local to the router with which the VLAN is configured. Therefore, two different network devices may not interpret a VLAN identifier as indicating the same VLAN and/or may not treat the same VLAN identifier in the same manner. In contrast, tenancy, as described herein, is a global construct such that a tenant may be mapped to any VLAN on any network device within network system 2 of FIG. 1. Furthermore, the use of tenancy is hierarchical in that an administrator may create subtenants as well as configure different policies for each subtenant. These subtenants may be identified not just using a VLAN, but additionally through the use of prefixes as well.

Additionally, in some examples, an incoming packet is received after Network Address Translation (NAT) has been performed on the packet such that the incoming interface VLAN of a received packet may not have meaning to the network device. Through the use of tenancy as described herein, a network device may use the first portion of metadata of the packet that specifies the tenant identifier to map the received packet to a corresponding VRF instance. In contrast, if the received packet were to carry a VLAN tag, then every network device 110 within network system 2 would be required to configure the same VLAN to the same VRF. This may be cumbersome, prone to error, and more inflexible than the use of tenant identifiers as described herein. For example, a network device as described herein may perform tenant-to-VRF instance mapping differently than each other network device within network system 2 such that the same VRF instance does not need to be configured for the same VLAN across every router within network system 2. Accordingly, a network device that maps tenancy to VRF instances as described herein may be more flexible than other network devices that rely on mapping VLANs to VRF instances.

As an illustration of the above, network device 110 assigns tenant 104A of FIG. 1 to VRF instance 204A. In this example, tenant 104A is hierarchical in that tenant 104A includes multiple subtenants, each of which are associated with a unique VLAN. RIB 206A of VRF instance 204A may therefore be configured to include routes for multiple VLANs, e.g., each VLAN associated with each subtenant of tenant 104A. In this fashion, network device 110 may use tenant 104A as an hierarchical abstraction to group routes for multiple VLANs into a single VRF.

Example configuration mappings for tenant-based VRF instances in accordance with the techniques of the disclosure are set forth in the below:

Table 1 depicts an example configuration for adding a VRF instance to a BGP connection. As depicted in Table 1, the example configuration installs a VRF instance named "red" with BGP protocol information including a router address of "10.1.1.1," a neighbor address of "10.1.1.2," for Autonomous System named "3000."

TABLE 1

```
router Test
    routing
        name vrf-red
            type red
            routing-protocol bgp
                router-id 10.1.1.1
                neighbor
                    neighbor-address 10.1.1.2
                    neighbor-as 3000
```

Table 2 depicts an example configuration for installing a static rout into a RIB table of a VRF instance. In the example of Table 2, the configuration installs a VRF instance named "red" with a type "red" and a static route of "11.1.1.1/32 10 next-hop-interface LAN node test-node" into a router named "Test."

TABLE 2

```
router Test
    routing
        name vrf-red
            type red
            static-route 11.1.1.1/32 10 next-hop-interface LAN node
                test-node
```

Table 3 depicts an example configuration for a VRF-tenant mapping. In the example of Table 3, the configuration installs a VRF instance named "vrf-red" of type "red" for tenants "finance" and "eng" in a router named "Test." The configuration further installs a VRF instance named "vrf-blue" of type "blue" for tenants "test" and "pm" in the router named "Test."

TABLE 3

```
router Test
    routing
        name vrf-red
            type red
            tenant-name finance
            tenant-name eng
        routing
            name vrf-blue
            type blue
            tenant-name test
            tenant-name pm
```

Table 4 depicts an example configuration for a VRF-subtenant mapping. In the example of Table 4, the configuration installs a VRF instance named "vrf-red" of type "red" for tenant "finance" in a router named "Test." The configuration further installs a VRF instance named "vrf-blue" of type "blue" for subtenant "mark.finance" in the router named "Test."

TABLE 4

```
router Test
    routing
        name vrf-red
            type red
            tenant-name finance
        routing
            name vrf-blue
            type blue
            tenant-name mark.finance
```

Table 5 depicts an example configuration for a VRF instance assigned to each of two tenants and a configuration for two services, each service having a different tenant access policy. In the example of Table 5, the configuration installs a VRF instance named "vrf-red" of type "red" for tenant "finance" in a router named "Test" and further installs a VRF instance named "vrf-blue" of type "blue" for tenant "eng" in the router named "Test." The configuration further installs an address of "10.1.1.0/24" to a service named "Web," and defines an access policy that permits tenant "finance" to access service "Web." The configuration further installs an address of "10.1.1.0/24" to a service named "database," and defines an access policy that permits tenant "eng" to access service "database." In this example, service "web" and service "database" have an overlapping (e.g., the same) address, such that tenant "finance" and tenant "eng" reach different services using the same address.

TABLE 5

```
router Test
    routing
        name vrf-red
        type red
        tenant-name finance
    routing
        name vrf-blue
        type blue
        tenant-name eng
    Service web
        address 10.1.1.0/24
        access-policy tenant finance
    Service database
        address 10.1.1.0/24
        access-policy tenant eng
```

Table 6 depicts an example an example configuration for a VRF instance assigned to each of two tenants and a configuration for one service having an access policy that permits two different tenants. In the example of Table 6, the configuration installs a VRF instance named "vrf-red" of type "red" for tenant "finance" in a router named "Test" and further installs a VRF instance named "vrf-blue" of type "blue" for tenant "eng" in the router named "Test." The configuration further installs an address of "10.1.1.0/24" to a service named "Web," and defines a first access policy that permits tenant "finance" to access service "Web" and a second access policy that permits tenant "eng" to access service "Web."

TABLE 6

```
router Test
    routing
        name vrf-red
        type red
        tenant-name finance
    routing
        name vrf-blue
        type blue
        tenant-name eng
    Service web
        address 10.1.1.0/24
        access-policy tenant finance
        access-policy tenant eng
```

Figure 3:
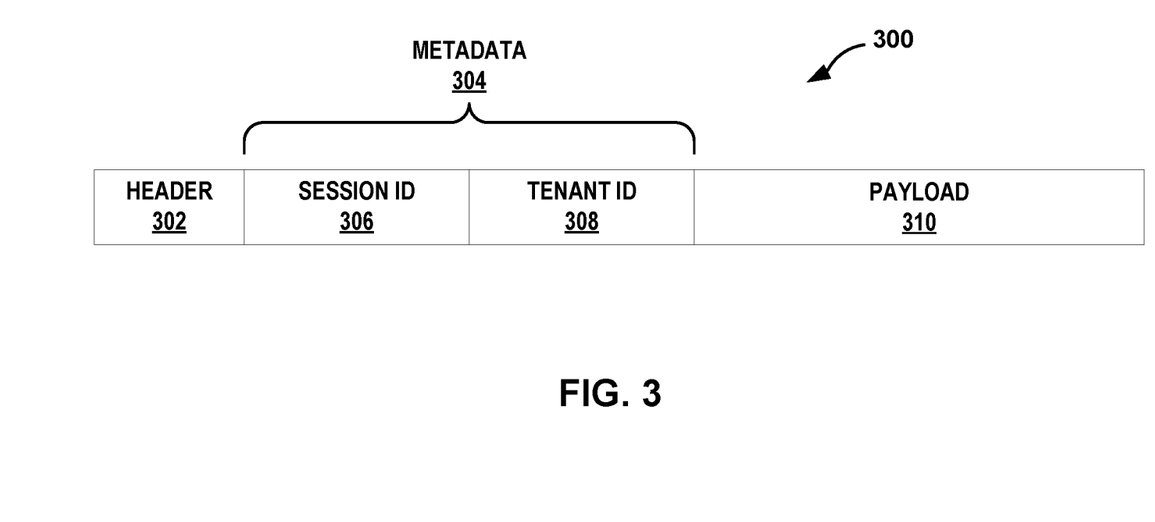
FIG. 3 is a block diagram illustrating an example packet in accordance with the techniques of the disclosure.

FIG. 3 is a block diagram illustrating example packet 300 in accordance with the techniques of the disclosure. In some examples, packet 300 comprises an Internet Protocol version 4 (IPv4) packet. In some examples, packet 300 comprises an Internet Protocol version 6 (IPv6) packet. In the example of FIG. 3, packet 300 comprises header field 302, metadata field 304, and payload field 310.

Header field 302 typically comprises 5-tuple information, e.g., a source address, a source port, a destination address, and a destination port for the packet. Payload field 310 comprises the data portion of packet 300, e.g., the data or message transported by packet 300.

Metadata field 304 comprises session identifier field 306 and tenant identifier field 308. Session identifier field 306 identifies a bidirectional network session associated with a packet flow comprising packet 300 and a reverse packet flow. In some examples, session identifier field 306 specifies a session identifier comprising a source address and source port of the network device originating packet 300 and a destination address and destination port of the destination network device for packet 300, each of which may differ from header field 302 due to Network Address Translation (NAT) and the session-based routing techniques described above.

Tenant identifier field 308 identifies a tenant associated with packet 300. In some examples, tenant identifier field 308 is a natural language text string that comprises a human-readable name for the tenant associated with packet 300 such as "finance," "eng," "test," "pm," "mark.finance," etc. As described herein, a "tenant" is a source of network traffic and consumes network services provided by system 2 of FIG. 1.

Figure 4:
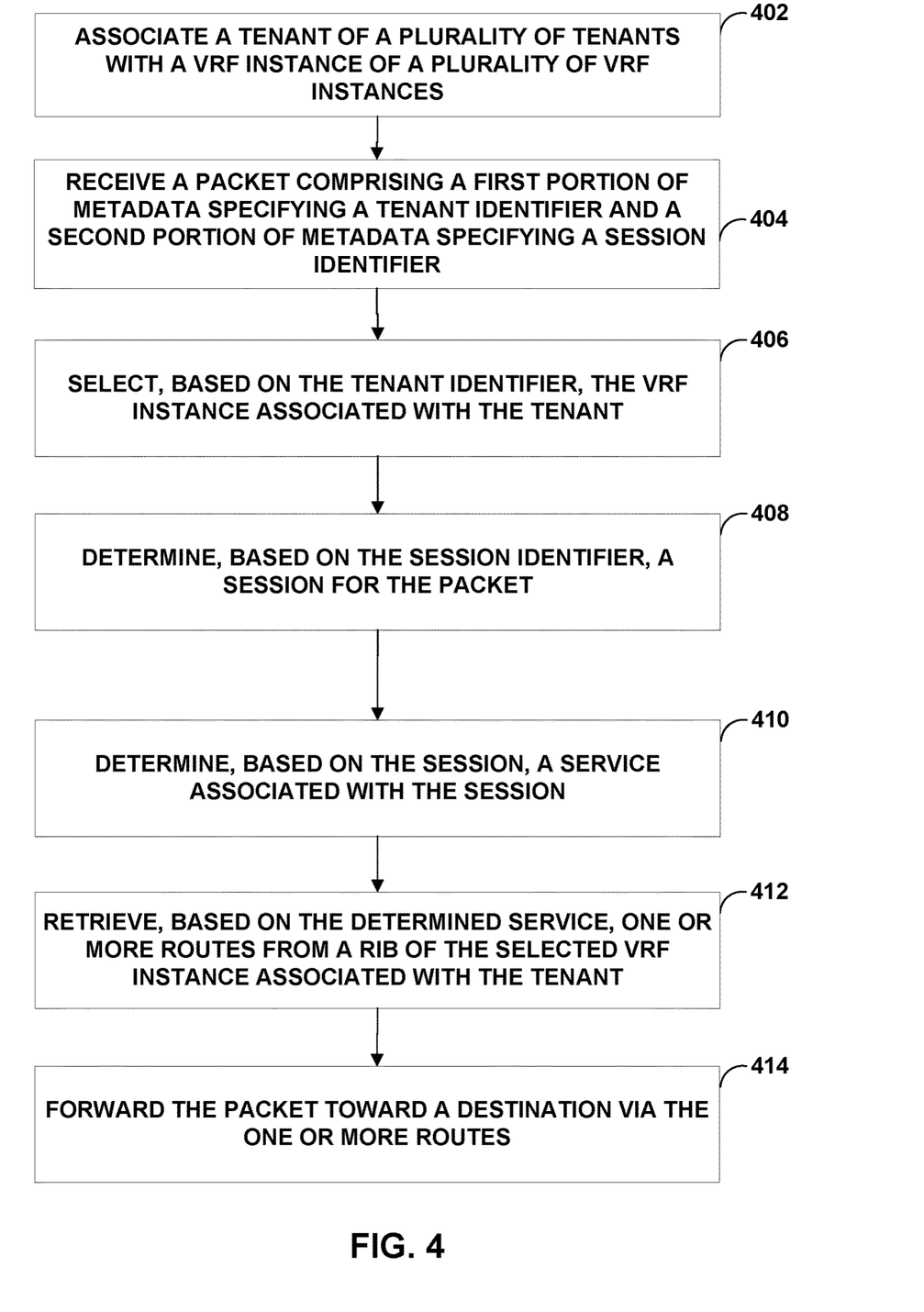
FIG. 4 is a flowchart illustrating an example operation in accordance with the techniques of the disclosure.

FIG. 4 is a flowchart illustrating an example operation in accordance with the techniques of the disclosure. Specifically, FIG. 4 depicts an example operation of a network device (e.g., network device 110A of FIG. 1) for using a VRF instance assigned to a tenant to forward network traffic associated with the tenant. FIG. 4 is described with respect to FIGS. 1 and 2 for convenience.

As depicted in the example of FIG. 4, network device 110 associates a tenant of a plurality of tenants with VRF instance 204A of a plurality of VRF instances 204 (402). For example, routing engine 203 creates tenant-VRF mappings 210 between each tenant of a plurality of tenants 104 and each VRF instance of a plurality of VRF instances 204. As one example, routing engine 203 stores an association between tenant 104A and VRF instance 204A.

Control unit 202 receives, via one of incoming links 228, a packet (404). The packet comprises a header, payload data, and metadata. A first portion of the metadata comprises a tenant identifier that identifies tenant 104A. A second portion of the metadata comprises a session identifier that identifies a session associated with the packet. In some examples, the packet may be substantially similar to packet 300 of FIG. 3. Routing engine 203 selects, based on the first portion of the metadata specifying the tenant identifier for tenant 104A, VRF instance 204A as the VRF instance associated with the tenant (406). For example, routing engine 203 determines that the tenant identifier specified by the metadata of the packet matches a tenant identifier assigned to VRF instance 204A stored in tenant-VRF mappings 210.

Furthermore, routing engine 203 determines, based on the second portion of the metadata specifying the session identifier, a session associated with a packet flow comprising the packet and a reverse packet flow (408). For example, the session identifier may comprise, e.g., a source address and source port, a destination address and destination port, and a protocol used by the packet. Routing engine 203 further determines, based on the session associated with the packet, a service associated with the session (410). Routing engine 203 retrieves, based on the determined service, one or more routes from RIB 206A of VRF instance 204A (412). In some examples, routing engine 203 applies, based on the service associated with the packet, one or more policies to the packet. Routing engine 203 forwards, via packet forwarding engine 222, the packet toward a destination for the packet via the one or more routes retrieved from RIB 206A associated with the tenant (414).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:
    associating, by a network device, a tenant with a virtual routing and forwarding (VRF) instance of a plurality of VRF instances;
    receiving, by the network device, a packet comprising a first portion of metadata specifying a tenant identifier for the tenant and a second portion of metadata specifying a session identifier for a session associated with the packet;
    selecting, by the network device and based on the first portion of metadata specifying the tenant identifier, the VRF instance associated with the tenant;
    determining, by the network device and based on the second portion of metadata specifying the session identifier, the session associated with the packet;
    determining, by the network device and based on the session, a service associated with the session;

retrieving, by the network device and from a forwarding information base (FIB) of the selected VRF instance associated with the tenant, an address of a destination for the packet;

performing, by the network device and based on the determined service associated with the session, a lookup of one or more routes to the address of the destination;

storing, by the network device and in a routing information base (RIB) of the selected VRF instance associated with the tenant, the one or more routes to the address of the destination; and forwarding, by the network device, the packet toward the destination for the packet via the one or more routes stored in the RIB of the selected VRF instance associated with the tenant.

2. The method of claim 1, further comprising:

obtaining, by the network device and based on the service associated with the session, one or more policies for the service; and applying, by the network device, the one or more policies for the service to the packet.

3. The method of claim 2, wherein the one or more policies for the service comprise one or more of:

a path failover policy;

a Differentiated Services Code Point (DSCP) marking policy;

a traffic engineering policy; or a priority for network traffic associated with the session.

4. The method of claim 1, wherein the tenant identifier for the tenant comprises a natural language text string.

5. The method of claim 1, wherein associating the tenant with the VRF instance of the plurality of VRF instances comprises assigning, to the VRF instance of the plurality of VRF instances, the tenant identifier for the tenant, and wherein selecting, based on the first portion of metadata specifying the tenant identifier, the VRF instance of the plurality of VRF instances associated with the tenant comprises selecting the VRF instance of the plurality of VRF instances associated with the tenant based on a determination that the tenant identifier specified by the first portion of metadata is the same as the tenant identifier assigned to the VRF instance associated with the tenant.

6. The method of claim 1, wherein the packet comprises a first packet of a plurality of packets of a flow, and wherein forwarding the packet toward the destination via the one or more routes comprises forwarding the first packet and each subsequent packet of the flow in order toward the destination via the one or more routes.

7. The method of claim 1, wherein associating the tenant with the VRF instance of the plurality of VRF instances comprises associating each tenant of a plurality of tenants with a different VRF instance of the plurality of VRF instances.

8. The method of claim 1, wherein associating the tenant with the VRF instance of the plurality of VRF instances comprises:

associating, by the network device, a first tenant of a plurality of tenants with a first VRF instance of a plurality of VRF instances for the network device, wherein the first VRF instance for the network device to which the first tenant is assigned is different than a second VRF instance of a second plurality of VRF instances for a second network device to which the first tenant is associated.

9. The method of claim 1, further comprising:

associating, by the network device, a second tenant with a second VRF instance of the plurality of VRF instances different than the VRF instance;

receiving, by the network device, a second packet comprising a first portion of metadata specifying a second tenant identifier for the second tenant and a second portion of metadata specifying a second session identifier for a second session associated with the second packet;

selecting, by the network device and based on the first portion of metadata of the second packet specifying the second tenant identifier, the second VRF instance of the plurality of VRF instances associated with the second tenant;

determining, by the network device and based on the second portion of metadata of the second packet specifying the second session identifier, the second session associated with the second packet;

determining, by the network device and based on the second session, the service associated with the second session, wherein the service associated with the second session is the same as the service associated with the session;

retrieving, by the network device and from a second FIB of the selected second VRF instance associated with the second tenant, an address of a destination for the second packet that is the same as the address of the destination for the packet;

performing, by the network device and based on the determined service associated with the session, a lookup of one or more second routes to the address of the destination, wherein the one or more second routes are different from the one or more routes from the RIB of the selected VRF instance associated with the tenant;

storing, by the network device and in a second RIB of the selected second VRF instance associated with the second tenant, the one or more second routes to the address of the destination; and forwarding, by the network device, the second packet toward the destination for the second packet via the one or more second routes stored in the second RIB of the selected second VRF instance associated with the second tenant.

10. The method of claim 1, wherein performing the lookup of the one or more routes comprises performing a Border Gateway Protocol (BGP) lookup of the one or more routes, and wherein forwarding the packet toward the destination for the packet via the one or more routes stored in the RIB of the VRF instance associated with the tenant comprises retrieving, by the network device and from the RIB of the VRF instance of the plurality of VRF instances associated with the tenant, the one or more routes to the address of the destination.

11. A system comprising:

processing circuitry; and memory operably coupled to the processing circuitry and comprising instructions configured to cause the processing circuitry to:

associate a tenant with a virtual routing and forwarding (VRF) instance of a plurality of VRF instances;

receive a packet comprising a first portion of metadata specifying a tenant identifier for the tenant and a second portion of metadata specifying a session identifier for a session associated with the packet;

select, based on the first portion of metadata specifying the tenant identifier, the VRF instance associated with the tenant;

determine, based on the second portion of metadata specifying the session identifier, the session associated with the packet;

determine, based on the session, a service associated with the session;

retrieve, from a forwarding information base (FIB) of the selected VRF instance associated with the tenant, an address of a destination for the packet;

perform, based on the determined service associated with the session, a lookup of one or more routes to the address of the destination;

store, in a routing information base (RIB) of the selected VRF instance associated with the tenant, the one or more routes to the address of the destination; and forward the packet toward the destination for the packet via the one or more routes stored in the RIB of the selected VRF instance associated with the tenant.

12. The system of claim 11, wherein the processing circuitry is further configured to:

obtain, based on the service associated with the session, one or more policies for the service; and apply the one or more policies for the service to the packet.

13. The system of claim 12, wherein the one or more policies for the service comprise one or more of:

a path failover policy;

a Differentiated Services Code Point (DSCP) marking policy;

a traffic engineering policy; or a priority for network traffic associated with the session.

14. The system of claim 11, wherein to associate the tenant with the VRF instance of the plurality of VRF instances comprises, the processing circuitry is configured to assign, to the VRF instance of the plurality of VRF instances, the tenant identifier for the tenant, and wherein to select, based on the first portion of metadata specifying the tenant identifier, the VRF instance of the plurality of VRF instances associated with the tenant, the processing circuitry is configured to select the VRF instance of the plurality of VRF instances associated with the tenant based on a determination that the tenant identifier specified by the first portion of metadata is the same as the tenant identifier assigned to the VRF instance associated with the tenant.

15. The system of claim 11, wherein the packet comprises a first packet of a plurality of packets of a flow, and wherein to forward the packet toward the destination via the one or more routes, the processing circuitry is configured to forward the first packet and each subsequent packet of the flow in order toward the destination via the one or more routes.

16. The system of claim 11, wherein to associate the tenant with the VRF instance of the plurality of VRF instances, the processing circuitry is configured to associate each tenant of a plurality of tenants with a different VRF instance of the plurality of VRF instances.

17. The system of claim 11, wherein the processing circuitry is further configured to:

associate a second tenant with a second VRF instance of the plurality of VRF instances different than the VRF instance;

receive a second packet comprising a first portion of metadata specifying a second tenant identifier for the second tenant and a second portion of metadata specifying a second session identifier for a second session associated with the second packet;

select, based on the first portion of metadata of the second packet specifying the second tenant identifier, the second VRF instance of the plurality of VRF instances associated with the second tenant;

determine, based on the second portion of metadata of the second packet specifying the second session identifier, the second session associated with the second packet;

determine, based on the second session, the service associated with the second session, wherein the service associated with the second session is the same as the service associated with the session;

retrieve, from a second FIB of the selected second VRF instance associated with the second tenant, an address of a destination for the second packet that is the same as the address of the destination for the packet;

perform, based on the determined service associated with the session, a lookup of one or more second routes to the address of the destination, wherein the one or more second routes are different from the one or more routes from the RIB of the selected VRF instance associated with the tenant;

store, in a second RIB of the selected second VRF instance associated with the second tenant, the one or more second routes to the address of the destination; and forward the second packet toward the destination for the second packet via the one or more second routes stored in the second RIB of the selected second VRF instance associated with the second tenant.

18. The system of claim 11, wherein to perform the lookup of the one or more routes, the processing circuitry is configured to perform a Border Gateway Protocol (BGP) lookup of the one or more routes, and;

wherein to forward the packet toward the destination for the packet via the one or more routes stored in the RIB of the VRF instance associated with the tenant, the processing circuitry is configured to retrieve, from the RIB of the VRF instance of the plurality of VRF instances associated with the tenant, the one or more routes to the address of the destination.

19. A non-transitory, computer-readable medium comprising instructions that, when executed, are configured to cause processing circuitry of a network device to:

associate a tenant with a virtual routing and forwarding (VRF) instance of a plurality of VRF instances;

receive a packet comprising a first portion of metadata specifying a tenant identifier for the tenant and a second portion of metadata specifying a session identifier for a session associated with the packet;

select, based on the first portion of metadata specifying the tenant identifier, the VRF instance associated with the tenant;

determine, based on the second portion of metadata specifying the session identifier, the session associated with the packet;

determine, based on the session, a service associated with the session;

retrieve, from a forwarding information base (FIB) of the selected VRF instance associated with the tenant, an address of a destination for the packet;

perform, based on the determined service associated with the session, a lookup of one or more routes to the address of the destination;

store, in a routing information base (RIB) of the selected VRF instance associated with the tenant, the one or more routes to the address of the destination; and forward the packet toward the destination for the packet via the one or more routes stored in the RIB of the selected VRF instance associated with the tenant.

20. The non-transitory, computer-readable medium of claim 19, wherein the processing circuitry is further configured to:

obtain, based on the service associated with the session, one or more policies for the service; and apply the one or more policies for the service to the packet.

\* \* \* \* \*